United States Patent
Maalouf (10) Patent No.: US 11,145,034 B2
(45) Date of Patent: Oct. 12, 2021

(54) METHOD FOR DEBLURRING AN IMAGE

(71) Applicant: Idemia Identity & Security France, Courbevoie (FR)

(72) Inventor: Aldo Maalouf, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 51 days.

(21) Appl. No.: 16/688,190

(22) Filed: Nov. 19, 2019

(65) Prior Publication Data
US 2020/0160490 A1    May 21, 2020

(30) Foreign Application Priority Data
Nov. 20, 2018    (FR) .................. 1871638

(51) Int. Cl.
*G06T 5/00* (2006.01)
*G06T 7/12* (2017.01)
*G06T 7/11* (2017.01)
*G06F 17/18* (2006.01)

(52) U.S. Cl.
CPC ........... *G06T 5/003* (2013.01); *G06F 17/18* (2013.01); *G06T 7/11* (2017.01); *G06T 7/12* (2017.01); *G06K 2209/01* (2013.01)

(58) Field of Classification Search
CPC ... G06T 7/12; G06T 5/003; G06T 7/11; G06F 17/18; G06K 2209/01
USPC ........................................... 382/255
See application file for complete search history.

(56) References Cited

FOREIGN PATENT DOCUMENTS

EP    3086262 A1 * 10/2016    ........... G06K 9/6215

OTHER PUBLICATIONS

He, L., Wang, Y., Xiang, Z. (2016). Support Driven Wavelet Frame-based Image Deblurring. IEEE Transactions On Image Processing,1-15, https://arxiv.org/abs/1603.08108v1 (Year: 2016).*
Zeng, W., Lu, X., Fei, S. (2015). Image super-resolution employing a spatial adaptive prior model. Neurocomputing,162, 218-233, https://doi.org/10.1016/j.neucom.2015.03.049 (Year: 2015).*

(Continued)

*Primary Examiner* — Nancy Bitar
*Assistant Examiner* — Daniella M. DiGuglielmo
(74) *Attorney, Agent, or Firm* — Womble Bond Dickinson (US) LLP (57) ABSTRACT

A method of deblurring an observed image acquired by an image sensor in order to determine an observable image corresponding to the deblurred observed image. The observable image and the observed image each are formed by a set of pixels defined by at least one numerical value. The method involves expressing the observable image as a solution minimizing a Tikhonov functional defined by the observed image, applying a spreading function at the point of the image sensor and applying a wavelet transform operator. The Tikhonov functional is expressed as a sum of at least two terms. The method further involves determining the observable image by implementing an iterative projection algorithm released on a closed convex, at each iteration of which, the successive application of a projection operator associated with each of the terms of the Tikhonov functional.

12 Claims, 4 Drawing Sheets

(56) References Cited

OTHER PUBLICATIONS

Lou, Y., Zhang, X., Osher, S. et al. (2010). Image Recovery via Nonlocal Operators. J Sci Comput, 42, 185-197, https://doi.org/10.1007/s10915-009-9320-2 (Year: 2010).*

Chen, D., Zhou, Y. (2016). Inexact alternating direction method based on proximity projection operator for image inpainting in wavelet domain. Neurocomput, 189, 145-159, https://doi.org/10.1016/j.neucom.2015.12.095 (Year: 2016).*

Zhu, S., Su, Z., Li, L., Yang, Y, "Image deblurring based on nonlocal regularization with a non-convex sparsity constraint," Proc. SPIE 10615, Ninth International Conference on Graphic and Image Processing (ICGIP 2017), 106152F (Apr. 10, 2018); doi: 10.1117/12.2302490 (Year: 2018).*

Preliminary Search Report of the French National Institute of Industrial Property (INPI) for FR1871638 dated Sep. 10, 2019.

Li, X., 'Fine-Granularity and Spatially-Adaptive Regularization for Projection-Based Image Deblurring', IEEE Transactions On Image Processing, vol. 20, No. 4, 2011, pp. 971-983, DOI: 10.1109/TIP.2010.2081681.

He, L., Wang, Y., Xiang, Z., 'Support Driven Wavelet Frame-based Image Deblurring', IEEE Transactions On Image Processing, 2016, pp. 1-15, https://arxiv.org/abs/1603.08108.

* cited by examiner

METHOD FOR DEBLURRING AN IMAGE

CROSS-REFERENCE TO RELATED APPLICATIONS

This specification is based upon and claims the benefit of priority from French patent application number FR 1871638 filed on Nov. 20, 2018, the entire contents of which are incorporated herein by reference.

GENERAL TECHNICAL FIELD

The present invention relates to the field of identification, and in particular to a method for deblurring an observed image, in particular a finger image.

STATE OF THE ART

Fingerprint scanners are now found on many consumer devices such as mobile terminals or computers for user identification purposes. These scanners include high-resolution optical acquisition means capable of taking a picture of a finger for comparison with a reference image.

Today, such systems are satisfactory, but it can be seen that there are many "false rejections". It is sometimes necessary to acquire two or three fingerprints before the system recognizes the user.

These false rejections are due to image degradation, especially blurred images. This can be motion blur (if the finger is not perfectly still) or optical blur (if the focus is wrong, usually known as "defocus"—typically if the finger is not perfectly pressed against the scanner).

In order to limit this phenomenon and reduce the rate of false rejections, it is necessary to achieve the "deblurring" of the image, i.e. a Mathematical treatment aimed at finding the observable image (i.e. the "real" scene) from the observed image (the blurred image).

Mathematically, we can consider an acquisition model [Math 1]

$$g = h*u + b, \text{ with } u \in \mathcal{R}^n, g \in \mathcal{R}_{P}, b \in \mathcal{R}_{P}, h: \mathcal{R}^n \to \mathcal{R}_P$$

where u is the observable image, g is the observed image, b an additional bias from the system electronics (called noise), and h a continuous linear transform, typically a spreading point function (called PSF for "Point Spread Function"), i.e. a function describing the response of an imaging system to a point source (also called optical pulse response), representing a convolution nucleus introducing blur (motion and optical) into the image.

Deblurring the observed image g to find the observable image u from the observed image g represents a misplaced deconvolution problem.

Generally speaking, to solve such a problem, Tikhonov has defined a regularized solution known as Tikhonov Functional, expressed as:

$$\arg\min_{u \in \mathcal{R}^n} \{\|Hu - g\|^2 + \lambda \|x\|^2\} \quad \text{[Math 2]}$$

the first term represents fidelity to the observed image, and the second term is called regularization.

For years, we have known many deconvolution methods in five categories: linear methods (simple to implement but very sensitive to errors on the point spread function (PSF) data used for estimation; leading to artifacts in the deblurred image), non-linear methods (they only have a regularizing effect on the deblurred image, and are limited by the assumption that degradation noise can be modeled by an additional Gaussian noise model), statistical methods, wavelet based methods, and blind methods.

The use of wavelet transformation has generated significant work due to its ability to represent an image at different resolutions. Some of these algorithms propose a reverse estimation procedure that combines Fourier analysis with the wavelet approach. More precisely, the proposed algorithms include a Fourier domain inversion system that results in a regulated inverse filter allowing the algorithm to work even when the system is non-invertible. This method is generally followed by the removal of noise in the wavelet domain (e.g. by setting insignificant coefficients to zero). The set works by using the mean square error to find an optimal balance between Fourier domain regularization (system adapted) and wavelet domain regularization (signal/image adapted).

Another algorithm, presented in a document by Figueiredo, M. A. T. and R. D. Nowak in 2003, An EM algorithm for wavelet-based image restoration. IEEE Transactions on Image Processing, 12 (8):906-916, proposes an "Expectation-Maximization" (EM) approach for image restoration based on the penalized maximum likelihood that is formulated in the wavelet domain. In this algorithm, regularization is achieved by promoting reconstruction with low complexity expressed in terms of wavelet coefficients and takes advantage of the parsimony of wavelet representation. The problem, in general, with methods based on wavelet representation is that most of them require very demanding optimization methods, since the convolution operator is generally very difficult to represent in the wavelet domain. This naturally suggests the possibility of combining Fourier-based deconvolution and wavelet-based denoising.

These algorithms require a significant computation time and only handle one type of blur (motion or defocus blur).

Alternatively, it was proposed in a document by Chambolle and R. DeVore, N. Y. Lee and B. J. Lucier, Nonlinear wavelet image processing: Variational problems, compression, and noise removal through wavelet shrinkage, IEEE Trans. Image Processing, 7(3):319-335, 1998, for the use of "Iterative Shrinkage/Thresholding" algorithms. These use the proximal operator and iteratively use the wavelet coefficients threshold. These algorithms can handle both motion blur and defocus blur, but their convergence rate can become very slow if the problem is poorly conditioned.

It has therefore been proposed in a document by M. Carlavan et al., *Fast algorithm for regularized image restoration on wavelet coefficients*, GRETSI, Sep. 2009, Dijon, France, to "smooth" the functional in order to make it differentiable, and then use an $L_2$ minimization algorithm based on the Nesterov-type gradient, in order to determine a solution to the problem.

More precisely, the term regularization of the Tikhonov functional in the wavelet domain is used to obtain a modified functional that can be differentiated with a continuous Lipschitz gradient. Therefore, given the Tikhonov Functional $$\arg\min_{u \in \mathcal{R}^n}\left\{\frac{\lambda}{2}\|Hu - g\|_2^2 + \|Wu\|_1\right\} \quad \text{[Math 3]}$$

with $$W: \mathcal{R}^n \to \mathcal{R}^m \quad \text{[Math 4]}$$

the wavelet transform operator, a Lipschitz constant is obtained $$L_\psi = \lambda \|H\|_2^2 + \frac{1}{\mu}\|W\|_2^2 \qquad \text{[Math 5]}$$

where $\mu$ is a parameter that defines the accuracy of the regularization of the $L_1$ standard.

The problem observed is that the Lipschitz constant varies proportionally to $1/\mu$: if we want to obtain very precise solutions, we have to choose a very small value of $\mu$, but then the Lipschitz constant explodes and the algorithm becomes extremely slow because the descent step is small. This difficulty is explicitly mentioned at the end of part 2 (beginning of page 4) of the document by M. Carlavan et al.

It would therefore be desirable to have a new "unconstrained" deblurring method that does not depend on a regulation parameter $\mu$, and therefore allows all types of blurry material to be processed efficiently, robustly and quickly under all circumstances.

BRIEF DESCRIPTION OF THE INVENTION

According to a first aspect, the present invention relates to a method of deblurring an observed image acquired by optical acquisition means in order to determine an observable image corresponding to the deblurred observed image, said observable image and said observed image each being constituted as a set of pixels defined by at least one numerical value, the method being characterized in that it comprises the implementation by data processing means in the following steps:

(a) Expression of the observable image as a solution that minimizes a Tikhonov functional defined by the observed image, a spreading function of the point of the optical acquisition means and a wavelet transform operator, said Tikhonov functional being expressed as a sum of at least two terms;

(b) Determination of said observable image by implementing an iterative projection algorithm released on a closed convex, comprising, at each iteration, the successive application of a projection operator associated with each of said terms of the Tikhonov functional.

According to other advantageous and non limiting characteristics:

step (b) includes the use of the Nesterov minimization algorithm;
said projection operator is the proximal operator;
said Tikhonov functional is expressed as the sum of a first term in standard $L_2$ and a second regularization term in standard $L_1$;
the first term of said Tikhonov functional is
[Math 6]

$$\|Hu-g\|_2^2$$

where u is unknown, g is the observed image, and H is the spreading function of the point of the optical acquisition means;
the second term of said Tikhonov functional is
[Math 7]

$$\|Wu\|_1$$

where W is the wavelet transform operator;

said Tikhonov functional is $$\arg\min_{u\in\mathcal{R}^n}\left\{\frac{\lambda}{2}\|Hu-g\|_2^2 + \|Wu\|_1\right\} \qquad \text{[Math 8]}$$

the iterative projection algorithm released on a closed convex, comprising, at each iteration k, the successive calculation of $$x^{k+\frac{1}{2}} = prox_{\gamma f_1}(x^k) \text{ and } x^{k+1} = x^k + \lambda^k\, prox_{\gamma f_2}\left(2x^{k+\frac{1}{2}} - x^{k+1}\right) \qquad \text{[Math 9]}$$

where $x^k$, $x^{k+1/2}$ and $x^{k+1}$ are convergent approximations of the observable image, $\gamma>0$ an adaptation step, $f_1$ and $f_2$ respectively the first and second terms of the Tikhonov functional, and
[Math 10]

$$\lambda^k \in ]0.2[$$

a family of relaxation parameters such as
[Math 11]

$$\Sigma \lambda^k(2-\lambda^k) < +\infty$$

the method includes a preliminary step of acquisition of said image observed by the optical acquisition means;
the method includes the prior estimation of said spreading function of the point of the optical acquisition means by:
determination of Gaussian functions each connecting an observed reference image and an observable reference image for a plurality of displacements of predetermined amplitude in front of the optical acquisition means and/or a plurality of predetermined image recording heights in relation to the optical acquisition means,
average of said calculated Gaussian functions;
said optical acquisition means are a direct view type fingerprint sensor, said observed image being a finger image comprising at least one fingerprint.

According to a second aspect, the invention relates to a method of authentication or identification of an individual, comprising the implementation of a method according to the first aspect of deblurring an observed image acquired by optical acquisition means so as to determine an observable image corresponding to the deblurred observed image, and a step (d) for authenticating or identifying an individual by comparing fingerprints on the basis of the determined observable image.

According to a third aspect, the invention relates to a processing unit comprising data processing means configured to:

Express an observable image corresponding to a deblurred observed image, the observed image being acquired by optical acquisition means, said observable image and said observed image each being constituted as a set of pixels defined by at least one numerical value, as a solution minimizing a Tikhonov functional defined by the observed image, a spreading function of the optical acquisition means and a wavelet transform operator, said Tikhonov functional being expressed as a sum of at least two terms;

Determining said observable image by implementing an iterative projection algorithm released on a closed convex, comprising, at each iteration, the successive application of a projection operator associated with each of said terms of the Tikhonov functional.

According to other advantageous and non-limiting features, a system is proposed comprising the processing unit and said optical acquisition means.

According to a fourth and fifth aspect, the invention proposes a computer program product comprising code instructions for performing a method according to the first or second aspect of deblurring an observed image or authenticating or identifying an individual; and storage means readable by a computing device on which a computer program product comprises code instructions for performing a method according to the first or second aspect of deblurring an observed image or authenticating or identifying an individual.

DESCRIPTION OF THE FIGURES

Other features, purposes and advantages of the present invention will appear from the detailed description that follows, with regard to the attached figures, given as non-exhaustive examples and on which.

DETAILED DESCRIPTION

Architecture

Figure 1:
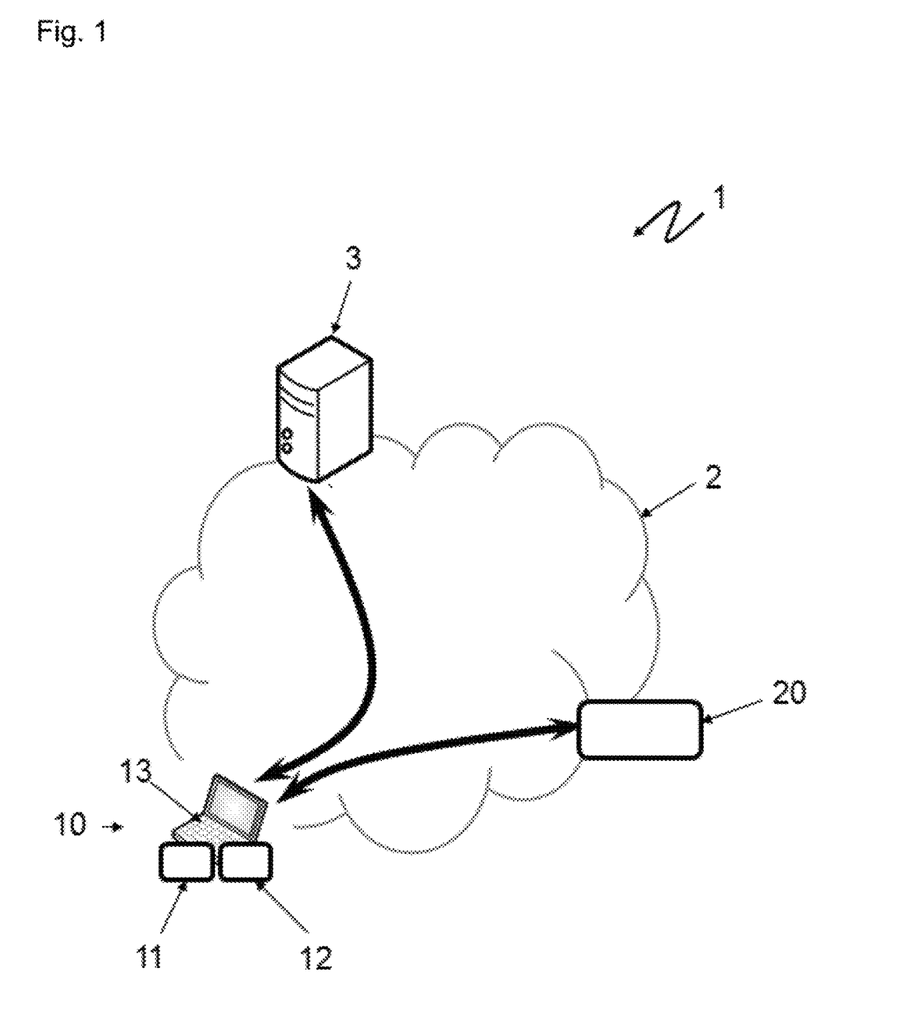
FIG. 1 schematically represents an image processing system for the implementation of the method according to the invention.

With reference to FIG. 1, a method of deblurring an observed image is proposed, implemented within an image processing system 1 as shown. "Deblurring" means removing or at least limiting blur on the observed image, i.e. determining an observable image corresponding to the deblurred observed image.

Note that the observed image is the one acquired by optical acquisition means 20, possibly blurred due to movement during acquisition (motion blur) or a poor position with respect to focal length (defocus blur), whereas the observable image is the "real" image, which is the one that could have been acquired if the shooting conditions were perfect.

In other words, the present method is a processing method of an observed image in order to reconstruct a better-quality image that could have been acquired if the conditions of positioning and movement were optimal.

Said images (observable or observed) are each constituted as a set of pixels defined by at least one numerical value. Preferably, each pixel is defined by a single numerical value, typically between 0 and 255, which is said to be associated with a gray scale. Alternatively each pixel can be in color and defined by a set of three digital values (RGB).

These images are advantageously images of one or more fingers, on the palm side of the hand, and depicting the tip of the finger or fingers on which the fingerprints are located, or the palm of the hand itself. More advantageously, optical acquisition means 20 are a direct view type fingerprint sensor (or scanner), such as a sensor based on thin-film transistor (TFT) technology. Reference may be made, for example, to US documents 2002/0054394 or 2002/0000915. An image acquired by such a sensor is generally presented with predominantly white pixels, i.e. with a gray level of 255, and with dark areas corresponding to shadows and prints with pixels with gray levels close to 0.

Figure 3A:
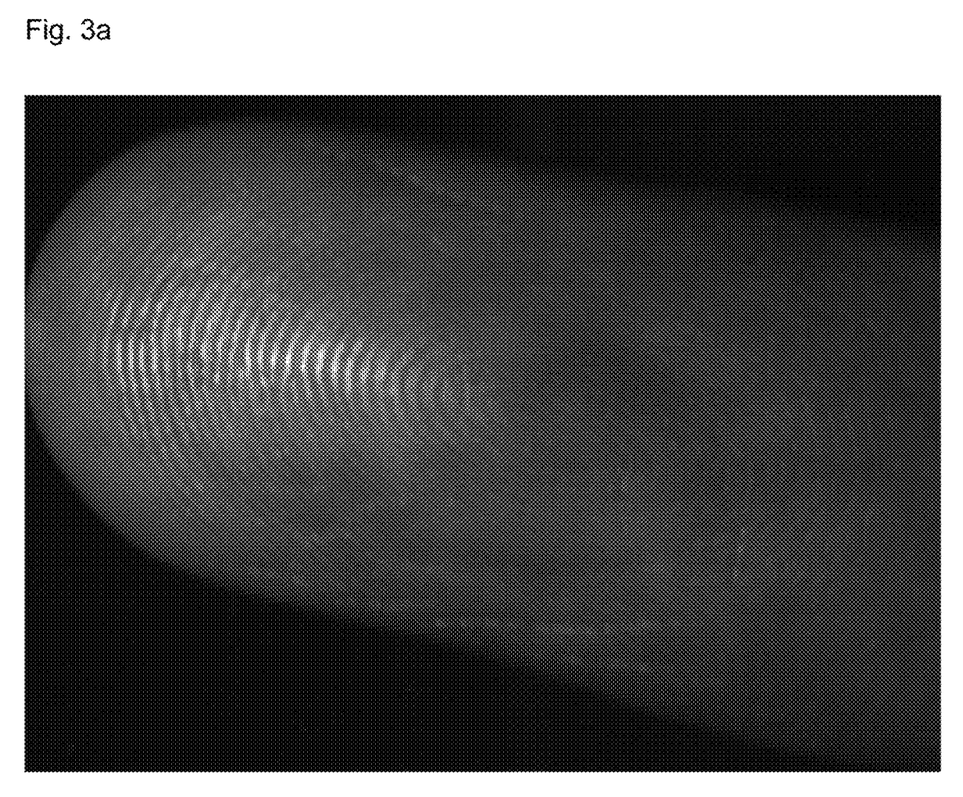
FIG. 3a shows an example of an observed image.

FIG. 3a shows an example of an observed image acquired from a fingerprint sensor in direct view. As we can see, this image is blurred (due to finger movement on the sensor during acquisition) and is not easily usable as it stands to perform identification or authentication processing on fingerprints, for example by extracting and comparing minutiae. Indeed it includes areas (especially in the center of the example shown), where the blur makes the ridges indistinguishable.

It is understood, however, that this method is not limited to finger images.

As shown schematically in FIG. 1, the image processing system 1 includes a processing unit 10, i.e. a computing device such as a computer. Processing unit 10 includes data processing means 11 such as a processor. Image processing can be implemented by an appropriate computer algorithm. The processing means 11 are then adapted to execute code instructions to implement the deblurring algorithm.

The image processing system 1 also advantageously includes said optical acquisition means 20 (image sensor), adapted to communicate with the processing unit 10 to transmit the acquired images to it. As such, the method may include a preliminary step of acquiring said image observed by the optical acquisition means 20. Advantageously, the image sensor is a direct view fingerprint sensor, for example of the thin-film transistor type.

The optical acquisition means 20 can be remote from the processing unit, and connected to it by a wireless connection, for example, a Wi-Fi connection type, etc.

The processing unit 10 can include a memory 12, a communication interface with the optical acquisition means 20, and a user interface (a screen in particular). Alternatively, the image processing system may also include an image database (e. g. stored on memory 12), from which the processing unit can retrieve images to be processed, which have been obtained by remote optical acquisition means. In one embodiment, the system 1 therefore does not include the optical acquisition means 20 (the observed images are provided to it from a remote server 3 by a third party who carries out the acquisition itself, for example an airport in which passenger identification by fingerprint recognition is implemented). It is just a matter of the unit 10 knowing the features. It should be noted that the system 1 can process both images acquired by local acquisition means and images provided from a server 3. A network 2 can connect the various possible elements 10, 3, 20.

As we will see, the unit 10 must have the point spreading function (PSF) of optical acquisition means 20, i.e. the Mathematical function describing the optical impulse response (OIR) of the means 20 to a point source, whose effect is described as a convolution operation. Note that we are indeed considering an acquisition model

[Math 12]

$$g = h*u + b, \text{ with } u \in \mathfrak{R}^n, g \in \mathfrak{R}_{P,b} \in \mathfrak{R}_{P,h}: \mathfrak{R}^n \to \mathfrak{R}_P$$

where u is the observable image, g is the observed image, b is noise, and h is the PSF (which will be represented in the rest of the description by a matrix H).

The PSF can be known and provided to the unit 10, alternatively (especially when the system 1 includes the means 20) the method can include a preliminary step of estimating the PSF of the optical acquisition means 20.

For this purpose it can be assumed that the PSF is mathematically modeled using the Gaussian beam concept. For this purpose, its estimation may include the determination of Gaussian functions each connecting an observed reference image with an observable reference image (the image of a point source is preferably taken) for a plurality of displacements of predetermined amplitude in front of the optical acquisition means 20 (for example, for a fingerprint sensor, displacements with an amplitude of between one and one hundred pixels with a step of five pixels) and/or a plurality of predetermined shooting heights with respect to the optical acquisition means 20 (for example, for a fingerprint sensor, heights between zero and two centimeters with respect to the surface of the sensor with a step of one millimeter).

The idea is to have a plurality of observable/observed image pairs corresponding to "calibrated" blurred images. The first Gaussian ones correspond to the motion blur (movement of the source in front of the sensor) and the second Gaussian ones correspond to the defocus blur (source too far from the sensor).

Figure 2:
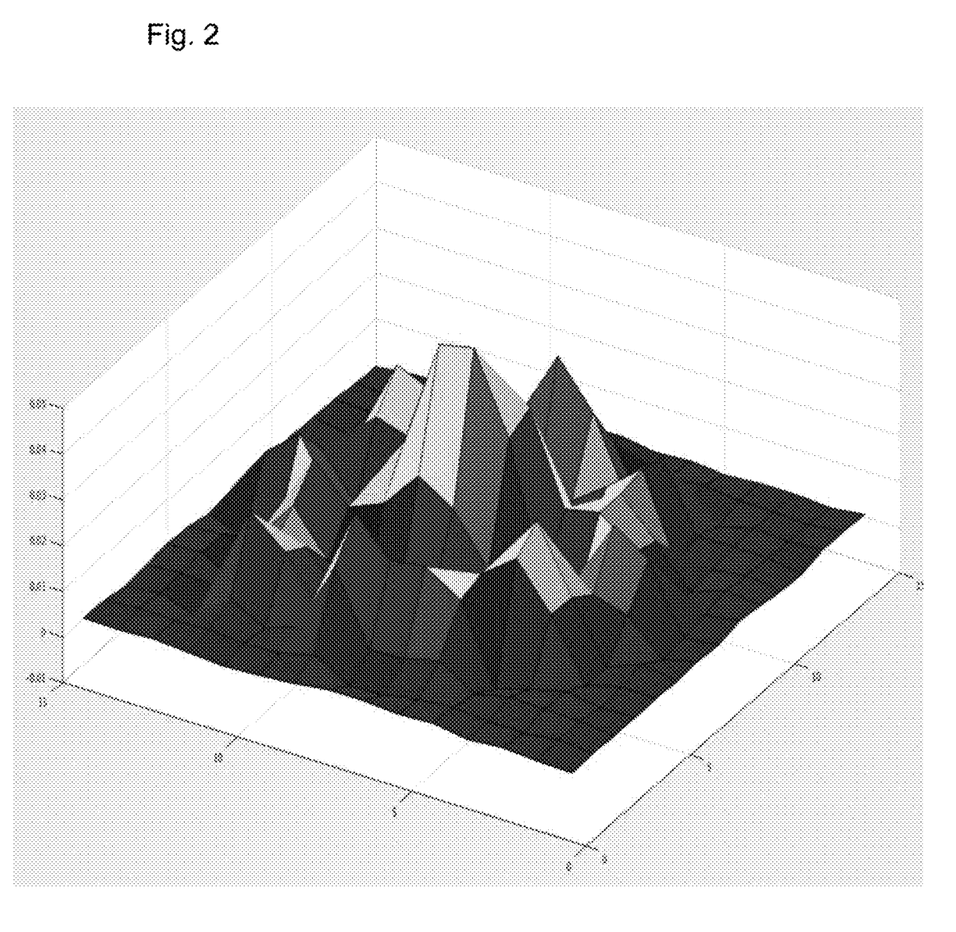
FIG. 2 shows an example of a point spreading function.

Then, the different Gaussian functions calculated are averaged to obtain an estimate of the PSF, an example of which is shown in FIG. 2.

Deblurring Method

As explained, the present deblurring method is implemented by the data processing means 11 of the unit 10 on the image, either acquired by the means 20 or received from the remote server 3.

As known, the method begins with a step (a) of expressing the observable image as a solution minimizing a Tikhonov functional defined by the observed image, a spreading function of the point of the optical acquisition means 20 and a wavelet transform operator, said Tikhonov functional being expressed as a sum of at least two terms (noted $f_1$, $f_2$, $f_3$, etc.). Preferably, at least one or all terms are convex functions, especially semi-continuous below. In the rest of the present description, we will take the example of exactly two terms (i.e. only two terms $f_1$ and $f_2$), the functional one comprising a first term $f_1$ in standard $L_2$ and a second term $f_2$ of regularization in standard $L_1$, but the skilled person can generalize to any sum of terms to be minimized.

As explained before, Tikhonov regularization is the most widely used method to solve problems that are poorly posed such as the current deconvolution problem. The first term $f_1$ of the functional represents fidelity to the observed image, and the second term $f_2$ is called regularization.

The functional can be expressed in the wavelet domain or directly in the image domain. In the context of this invention, the field of image will be preferred.

Therefore, the first term $f_1$ of said Tikhonov functional is advantageously

[Math 13]

$$\|Hu-g\|_2^2$$

where u is the unknown, g is the observed image, and H is the spreading function of the point of the optical acquisition means 20. It is understood that u has as value the observable image corresponding to the observed image g when the problem is solved, i.e. the minimized functional. We call û the value of u solution.

Similarly, the second term $f_2$ of said Tikhonov functional is advantageously

[Math 14]

$$\|Wu\|_1$$

where

[Math 15]

$$W: \mathfrak{R}^n \to \mathfrak{R}^m$$

is the wavelet transform operator ([Math 16]

$$\tilde{W}: \mathfrak{R}^n \to \mathfrak{R}^m$$

is the reconstruction operator, and we have

[Math 17]

$$c=Wu \text{ and } u=\tilde{W}c$$

if it is the wavelet transform of u).

The functional of Tikhonov is then a linear combination of the two terms, in particular $$\arg\min_{u \in \mathcal{R}^n}\left\{\frac{\lambda}{2}\|Hu-g\|_2^2 + \|Wu\|_1\right\} \quad \text{[Math 18]}$$

with $$\frac{\lambda}{2}\|Hu-g\|_2^2 + \|Wu\|_1 \quad \text{[Math 19]}$$

noted J(u). In the wavelet domain, the same functional is expressed by the formula $$\arg\min_{c \in \mathcal{R}^m}\left\{\frac{\lambda}{2}\|H\tilde{W}c-g\|_2^2 + \|c\|_1\right\} \quad \text{[Math 20]}$$

By $L_2$ standard, we mean the classical Euclidean standard, obtained from the scalar product, inducing the usual distance. By $L_1$ standard we mean the sum of the modules of the absolute values of the coefficients, inducing the distance of movement at right angles on a checkerboard, called "Manhattan distance".

The problem is that the $L_1$ standard is not derivable in zero; the second term is regularized in zero. However, the use of this $L_1$ standard is desirable since it provides the best results. As explained in the document by M. Carlavan et al., a solution is proposed consisting in approximating said second term (in standard $L_1$) in the wavelet domain in order to obtain a modified functional that can be differentiated with a continuous Lipschitz gradient. More precisely, the functional in the wavelet domain is "smoothed".

For this purpose, the proposed solution is the application to said second term in the wavelet domain of a shrinkage algorithm of the wavelet coefficients (note that c=Wu is u expressed in the wavelet domain, i.e. as the sum of wavelets weighted by wavelet coefficients).

In the present case, this smoothing is cleverly avoided by using a projection. As we will see, this technique is very advantageous since it does not need to know the standard of the term regularization.

More precisely, in a step (b) an iterative projection algorithm released on a closed convex is implemented, comprising, at each iteration, the successive application of a projection operator associated with each of said terms of the Tikhonov functional, so as to determine a solution to the problem which is said observable image.

We can minimize $$J(u) + \frac{\|u-g\|_2^2}{2\gamma} \in \mathbb{R} \cup \{+\infty\} \quad \text{[Math 21]}$$

noting that this function is strongly convex, of module $r^{-1}$, closed clean and therefore has a unique minimizer, which approaches the solution û.

By posing
[Math 22]

$$\partial f(x)$$

the sub-differential of a convex function f at point x, i.e. all the affine minor slopes of f, which are exact at x, we notice that for the above function $$0 \in \partial\left(J(u) + \frac{\|u-g\|_2^2}{2\gamma}\right) = u - g + \gamma \partial J(u) \quad [\text{Math 23}]$$

that can be rewritten in
[Math 24]

$$u = (I_d + \gamma \partial J)^{-1}(g)$$

this operator
[Math 25]

$$(I_d + \gamma \partial J)^{-1}$$

defining the projection on a closed set $C_k$, noted $\pi_k$, if the conjugate J* in the sense of Fenchel-Legendre (for a function f its conjugate is obtained by the formula f*(x)=sup (<x,s>-f(s)) is $1_k$.

Therefore, the functional of Tikhonov can simply be rewritten as $u=g-\pi_k(g)$.

To calculate $\pi_k(g)$, for example, it is sufficient to project wavelets into space by applying a narrowing function (closed subspace constructed from wavelet bases is preferred for calculation speed), so that the projection $\pi_k$ can be expressed in particular as
[Math 26]

$$\Sigma \langle x, e_i \rangle e_i$$

with $\{e_i\}$ being the base).

To do this, an iterative algorithm is implemented (starting from a starting point $x^0$, we calculate at the iteration
[Math 27]

$$k \in [\![0, N-1]\!]$$

a k+1st successive approximation $x^{k+1}$ of the observable image u from $x^k$, the converging algorithm) called "relaxed" projection. This means that at each iteration the projection operator is weighted by said relaxation parameter
[Math 28]

$$\lambda^k \in ]0, 2[$$

all λk forming a family such as
[Math 29]

$$\Sigma \lambda^k (2 - \lambda^k) < +28$$

We say that if
[Math 30]

$$\lambda^k \in ]0, 1[$$

the projection is "under-released", and that if
[Math 31]

$$\lambda^k \in ]1, 2[$$

the projection is "over-relaxed".
Noting that
[Math 32]

$$(I_d + \partial f)^{-1}$$

is an expression of the proximal operator, a proximal operator is preferred as the projection operator.

As explained, the projection includes, at each iteration, the successive application of a projection operator associated with each of said terms of the Tikhonov functional. This means that we have "partial" projections and that in practice, by noting K the number of terms of the functional, K-1 other approximations of the observable image noted $x^{k+1/K}$, $x^{k+2/K}$, ... $x^{k+(K-1)/K}$ are calculated between $x^k$ and $x^{k+1}$ as internal states. For example, if K=2 (a classic case of only two terms), at iteration k we have a first projection operator associated with the first term that is applied to $x^k$ so as to obtain $x^{k+1/2}$ and a second projection operator associated with the second term that is applied to $x^{k+1/2}$ (and $x^k$) so as to obtain $x^{k+1}$. It should be noted that advantageously only one of these partial projections is released (in this case the last one, the one associated with the term of regularization).

In the case of proximal operators, preferably, each iteration includes the successive calculation of $$x^{k+\frac{1}{2}} = prox_{\gamma f_1}(x^k) \text{ and } x^{k+1} = x^k + \lambda^k \, prox_{\gamma f_2}\left(2x^{k+\frac{1}{2}} - x^{k+1}\right) \quad [\text{Math 33}]$$

The skilled person will prefer to use the Nesterov algorithm to accelerate the calculation without any Lipschitz constant constraint (We can mention as such the publications by Y. Nesterov, Excessive gap technique in nonsmooth convex minimization. SIOPT, 16:235-249, 2005, Y. Nesterov, Smooth minimization of non-smooth functions. Mathematic Programming, Ser. A, 103:127-152, 2005, and Y. Nesterov, Smooth minimization of non-smooth functions. Mathematic Programming, Ser. A, 103:127-152, 2005). Convergence is achieved in practice in three iterations.

Figure 3B:
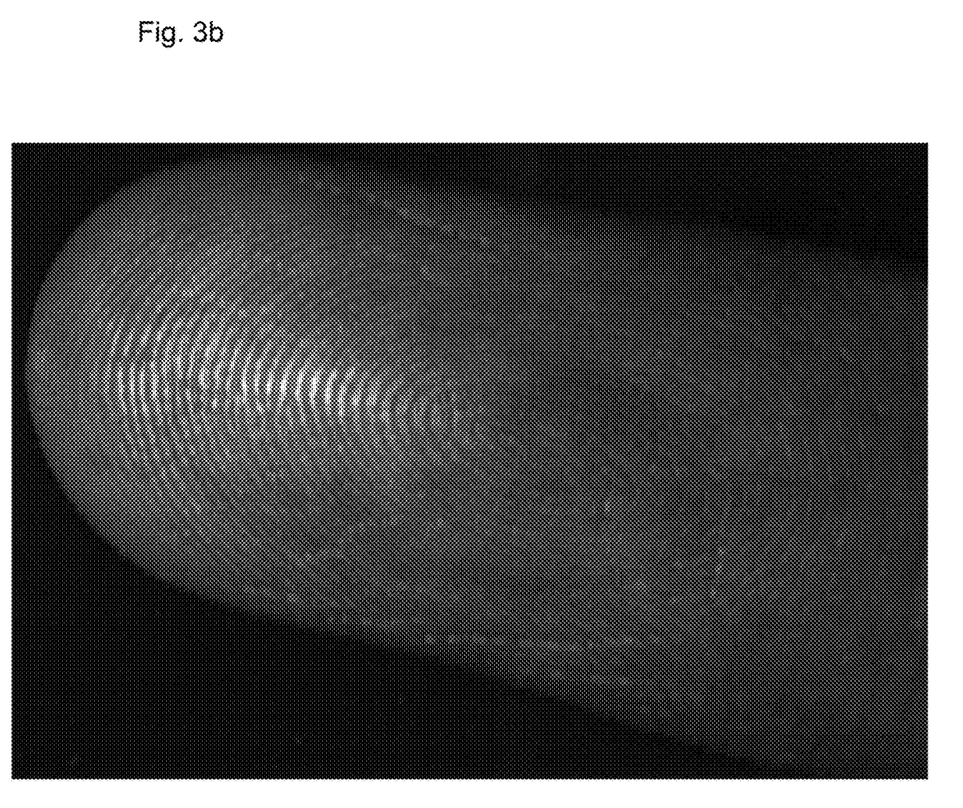
FIG. 3b represents an example of the observable image corresponding to the observed image in FIG. 3a, obtained by the implementation of the method according to the invention.

Results:

Tests show that for an observed image of 2080×1080 pixels, the corresponding observable image is obtained in 0.18 seconds on a Core Duo processor. FIG. 3b shows the image obtained by deblurring the image in FIG. 3a. We can clearly see the quality gain on the central area.

Identification or Authentication Method

According to a second aspect, the invention relates to a method of authentication or identification of individuals including the deblurring method according to the first aspect.

More precisely, in the case where said optical acquisition means 20 are a direct view type fingerprint sensor (said observed image being a finger image comprising at least one fingerprint). The authentication or individual identification method comprises, following the deblurring of the observed image in order to determine an observable image corresponding to the deblurred observed image, a step (c) of authentication or individual identification by comparing fingerprints based on the determined observable image.

Processing Unit and System

According to a third aspect, the invention proposes the treatment unit 10 for the implementation of the method according to the first or second aspect.

The processing unit 10 includes data processing means 11, and if necessary a memory 12 or an interface 13.

Preferably an image processing system 1 includes the unit 10 and the image acquisition means 20.

The data processing means 11 are configured to:

Express an observable image corresponding to a deblurred observed image, the observed image being acquired by optical acquisition means 20, said observable image and said observed image each being constituted as a set of pixels defined by at least one numerical value, as a solution minimizing a Tikhonov functional defined by the observed image, a spreading function of the point of the optical acquisition means 20 and a wavelet transform operator, said Tikhonov functional being expressed as a sum of at least two terms, and preferably comprising a first term in $L_2$ standard and a second regularization term in $L_1$ standard;

Determine said observable image by implementing an iterative projection algorithm released on a closed convex, comprising, at each iteration, the successive application of a projection operator associated with each of said terms of the Tikhonov functional.

Computer Program Product

According to a fourth and fifth aspects, the invention relates to a computer program product comprising code instructions for executing (in particular on the data processing means 11 of the unit 10) a method according to the first aspect of deblurring an observed image or a method according to the second aspect of the authentication or personal identification invention, as well as storage means readable by a computing device (a memory 12 of the unit 10) on which this computer program product is found.

The invention claimed is:

1. A method of deblurring an observed image acquired by optical acquisition means (20) so as to determine an observable image corresponding to the deblurred observed image, said observable image and said observed image each being constituted as a set of pixels defined by at least one numerical value, wherein the method comprises implementing by data processing means (11) the steps of:
   (a) expressing the observable image as a solution minimizing a Tikhonov functional defined by the observed image, a spreading function at the point of the optical acquisition means (20) and a wavelet transform operator, said Tikhonov functional being expressed as $$\arg\min_{u \in \mathcal{R}^n}\left\{\frac{\lambda}{2}\|Hu - g\|_2^2 + \|Wu\|_1\right\}$$

a sum of a first term $\|Hu-g\|_2^2$ in $L_2$ standard and a second regularization term $\|Wu\|_1$ in $L_1$ standard, where u is unknown, g is the observed image, H is the spreading function of the point of the optical acquisition means (20) and W is the wavelet transform operator;
   (b) determining said observable image by implementing an iterative projection algorithm released on a closed convex, comprising, at each iteration, a successive application of a projection operator associated with each of said terms of the Tikhonov functional.

2. A method according to claim 1, wherein step (b) comprises using a Nesterov minimization algorithm.

3. A method according to claim 1, wherein said projection operator is a proximal operator.

4. A method according to claim 1, wherein the iterative projection algorithm released on a closed convex, comprising, at each iteration k, a successive calculation of $$x^{k+\frac{1}{2}} = prox_{\gamma f_1}(x^k) \text{ and } x^{k+1} = x^k + \lambda^k\, prox_{\gamma f_2}\left(2x^{k+\frac{1}{2}} - x^{k+1}\right)$$ [Math 37]

where $x^k$, $x^{k+1/2}$, $x^{k+1}$ are convergent approximations of the observable image, $\gamma > 0$ an adaptation step, $f_1$ and $f_2$ respectively the first and second terms of the Tikhonov functional, and

[Math 38]
$$\lambda^k \in ]0,2[$$

a family of relaxation parameters such as
[Math 39]
$$\Sigma \lambda^k(2-\lambda^k) + \infty$$

5. A method according to claim 1, comprising a preliminary step of acquiring said image observed by the optical acquisition means (20).

6. A method according to claim 1, comprising first estimating said spreading function of the point of the optical acquisition means (20) by:
   determination of Gaussian functions each connecting an observed reference image and an observable reference image for a plurality of displacements of predetermined amplitude in front of the optical acquisition means (20) and/or a plurality of predetermined shooting heights in relation to the optical acquisition means (20),
   average of said calculated Gaussian functions.

7. A method according to claim 1, wherein said optical acquisition means (20) are a direct view type fingerprint sensor, said observed image being a finger image comprising at least one fingerprint.

8. A method of authenticating or identifying an individual, comprising implementing a method according to claim 7 of deblurring an observed image acquired by optical acquisition means (20) so as to determine an observable image corresponding to the deblurred observed image, and a step (c) of authenticating or identifying an individual by comparing fingerprints on the basis of the determined observable image.

9. A processing unit (10) comprising data processing means (11) configured to:
   express an observable image corresponding to a deblurred observed image, the observed image being acquired by optical acquisition means (20), said observable image and said observed image each being constituted as a set of pixels defined by at least one numerical value, as a solution minimizing a Tikhonov functional defined by the observed image, a spreading function at the point of the optical acquisition means (20) and a wavelet transform operator, said Tikhonov functional being expressed as $$\arg\min_{u \in \mathcal{R}^n}\left\{\frac{\lambda}{2}\|Hu - g\|_2^2 + \|Wu\|_1\right\}$$

a sum of a first term $\|Hu-g\|_2^2$ in $L_2$ standard and a second regularization term $\|Wu\|_1$ in $L_1$ in $L_1$ standard, where u is unknown, g is the observed image, H is the spreading function of the point of the optical acquistion means (20), and W is the wavelet transform operator;
   determine said observable image by implementing an iterative projection algorithm released on a closed convex, comprising, at each iteration, a successive application of a projection operator associated with each of said terms of the Tikhonov functional.

10. An image processing system (1) comprising a unit (10) according to claim 9 and said optical acquisition means (20).

11. A non-transitory computer program product comprising code instructions for executing a method according to claim 1 for deblurring an observed image or authenticating or identifying an individual, when said program is executed by a computer.

12. A non-transitory storage medium readable by a computing device on which a computer program product includes code instructions for performing a method according to claim 1 of deblurring an observed image or authenticating or identifying an individual.

* * * * *